(12) United States Patent
Nachenberg

(10) Patent No.: US 9,805,204 B1
(45) Date of Patent: Oct. 31, 2017

(54) SYSTEMS AND METHODS FOR DETERMINING THAT FILES FOUND ON CLIENT DEVICES COMPRISE SENSITIVE INFORMATION

(71) Applicant: Symantec Corporation, Mountain View, CA (US)

(72) Inventor: Carey S. Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 196 days.

(21) Appl. No.: 14/834,474

(22) Filed: Aug. 25, 2015

(51) Int. Cl.
| | |
|---|---|
| H04L 29/06 | (2006.01) |
| G06F 17/30 | (2006.01) |
| G06F 21/60 | (2013.01) |
| G06F 7/04 | (2006.01) |
| H04N 7/16 | (2011.01) |

(52) U.S. Cl.
CPC ........ *G06F 21/60* (2013.01); *G06F 17/30109* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 8,321,560 B1 * | 11/2012 | Pai | .................. | G06F 11/0709 709/224 |
| 8,495,705 B1 * | 7/2013 | Verma | .................. | G06Q 10/06 711/163 |
| 8,769,683 B1 * | 7/2014 | Oliver | .................. | G06F 21/561 719/311 |
| 8,898,774 B2 * | 11/2014 | Gianoulakis | .......... | G06F 21/577 709/224 |
| 9,529,977 B1 * | 12/2016 | Nijjar | .................. | G06F 21/00 |
| 2004/0128552 A1 * | 7/2004 | Toomey | .................. | G06F 21/57 726/22 |

(Continued)

OTHER PUBLICATIONS

Joseph Chen; Systems and Methods for Enforcing Data Loss Prevention Policies on Mobile Devices; U.S. Appl. No. 13/903,994, filed May 28, 2013.

(Continued)

*Primary Examiner* — Eric Chen
(74) *Attorney, Agent, or Firm* — FisherBroyles, LLP

(57) ABSTRACT

The disclosed computer-implemented method for determining that files found on client devices comprise sensitive information may include (1) maintaining, on a server, a set of representations of files that have been classified as sensitive according to a data loss prevention policy, (2) receiving, from a client device, a message that includes a representation of a file on the client device, (3) determining that the representation of the file on the client device matches the representation of a sensitive file from the set of representations of files, (4) concluding, based on the representation of the file on the client device matching the representation of the sensitive file, that the file on the client device includes sensitive information, and (5) performing a security action in response to concluding that the file on the client device includes the sensitive information. Various other methods, systems, and computer-readable media are also disclosed.

19 Claims, 7 Drawing Sheets

(56) References Cited

U.S. PATENT DOCUMENTS

| | | | |
|---|---|---|---|
| 2004/0172551 A1* | 9/2004 | Fielding | G06F 21/564 726/24 |
| 2007/0150948 A1* | 6/2007 | De Spiegeleer | G06F 21/56 726/22 |
| 2010/0024037 A1* | 1/2010 | Grzymala-Busse | G06F 21/6245 726/26 |
| 2011/0307951 A1* | 12/2011 | Yermakov | H04L 63/0227 726/12 |
| 2013/0067577 A1* | 3/2013 | Turbin | G06F 21/562 726/24 |
| 2013/0133071 A1* | 5/2013 | Mahaffey | G06F 21/564 726/23 |
| 2013/0227714 A1* | 8/2013 | Gula | G06F 21/64 726/32 |
| 2014/0068706 A1* | 3/2014 | Aissi | G06F 21/6254 726/1 |
| 2014/0101751 A1* | 4/2014 | Lee | H04L 43/028 726/13 |
| 2015/0089647 A1* | 3/2015 | Palumbo | H04L 63/145 726/23 |
| 2015/0118992 A1* | 4/2015 | Wyatt | H04W 12/08 455/410 |
| 2015/0154420 A1* | 6/2015 | Wu | G06F 21/16 726/27 |

OTHER PUBLICATIONS

Joseph Chen, et al.; Systems and Methods for Trust Propagation of Signed Files Across Devices; U.S. Appl. No. 13/895,993, filed May 16, 2013.

"Symantec Endpoint Protection", https://www.symantec.com/endpoint-protection/, as accessed Jun. 25, 2015, Symantec Corporation, (Jan. 14, 2012).

* cited by examiner

SYSTEMS AND METHODS FOR DETERMINING THAT FILES FOUND ON CLIENT DEVICES COMPRISE SENSITIVE INFORMATION

BACKGROUND

Corporate networks are often filled with sensitive information in the form of confidential emails, company-private documents, personally identifying information, financial information, and more. The sensitive information may be spread across dozens or even hundreds of servers and/or personal computers. Ensuring that this information is kept secure may be very important for both an organization's reputation and for its success. Organizations may have data loss prevention (DLP) policies to ensure that sensitive information is handled correctly. Many organizations enforce DLP policies with the help of DLP applications that scan files and classify the files according to the policies. The DLP applications may prevent certain actions from being taken on sensitive files or may warn users that files are subject to the policies. These DLP applications may run on endpoint devices, servers, or both.

Traditional DLP applications may scan every file on a computing device to determine each file's classification according to a DLP policy. However, scanning and classifying every file on a device may consume a large amount of computing resources. Some users may avoid running a DLP application on their device out of concern for the resource use, causing files on their device to remain unclassified and increasing the risk of data breaches. Accordingly, the instant disclosure identifies and addresses a need for additional and improved systems and methods for determining that files found on client devices comprise sensitive information.

SUMMARY

As will be described in greater detail below, the instant disclosure describes various systems and methods for determining that files found on client devices comprise sensitive information by comparing representations of the files on a client device with representations of files on a server that have already been classified as including sensitive information.

In one example, a computer-implemented method for determining that files found on client devices include sensitive information may include (1) maintaining, on a server, a set of representations of files that have been classified as sensitive according to a DLP policy, (2) receiving, from a client device, a message that includes a representation of a file that was found on the client device, (3) determining that the representation of the file that was found on the client device matches the representation of a sensitive file from the set of representations of files that have been classified as sensitive, (4) concluding, based on the representation of the file that was found on the client device matching the representation of the sensitive file, that the file that was found on the client device includes sensitive information, and (5) performing a security action in response to concluding that the file that was found on the client device includes sensitive information.

In some examples, performing the security action may include sending a message to the client device that indicates that the file that was found on the client device may include sensitive information. Additionally or alternatively, the computer-implemented method may further include determining, based at least in part on concluding that the file found on the client device includes sensitive information, that the client device is a high-importance device that includes sensitive information and increasing DLP protections for the client device in response to determining that the client device is a high-value device.

In some examples, maintaining the set of representations of files that have been classified as sensitive may include receiving at least one set of representations of classified files from a file server and/or an email server. Additionally or alternatively, maintaining the set of representations of files that have been classified as sensitive may include identifying a set of unclassified files on the server and classifying the unclassified set of files according to the DLP policy.

In one embodiment, the client device may include a network gateway, and performing the security action may include blocking the file from being transmitted by the network gateway.

In one embodiment, the computer-implemented method may further include (1) adding a representation of a new file to the set of files that have been classified as sensitive, (2) determining that the new file matches a representation of a previously received file from the client device, and (3) concluding, based on the representation of the previously received file from the client device matching the representation of the new file, that the previously received file includes additional sensitive information. In this embodiment, the computer-implemented method may further include performing an additional security action in response to concluding that the previously received file from the client device includes additional sensitive information.

In some embodiments, the computer-implemented method may further include (1) creating, on the client device, representations of a plurality of files, where the representations of the files include hashes of the files, (2) sending, from the client device to the server, the hashes of the files, (3) comparing, on the server, the hashes of the files to the set of representations of files that have been classified, and (4) sending, from the server to the client device, an indication of which of the hashes of the files matched hashes of files that have been classified as sensitive. In other embodiments, the client device may send filenames and/or other information that identifies files instead of hashes.

In one embodiment, a system for implementing the above-described method may include (1) a maintaining module, stored in memory, that maintains, on a server, a set of representations of files that have been classified as sensitive according to a DLP policy, (2) a receiving module, stored in memory, that receives, from a client device, a message that includes a representation of a file that was found on the client device, (3) a determination module, stored in memory, that determines that the representation of the file that was found on the client device matches the representation of a sensitive file from the set of representations of files that have been classified as sensitive, (4) a conclusion module, stored in memory, that concludes, based on the representation of the file that was found on the client device matching the representation of the sensitive file, that the file that was found on the client device may include sensitive information, (5) a security module, stored in memory, that performs a security action in response to concluding that the file that was found on the client device may include sensitive information, and (6) at least one physical processor configured to execute the maintaining module, the receiving module, the determination module, the conclusion module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain, on a server, a set of representations of files that have been classified as sensitive according to a DLP policy, (2) receive, from a client device, a message that includes a representation of a file that was found on the client device, (3) determine that the representation of the file that was found on the client device matches the representation of a sensitive file from the set of representations of files that have been classified as sensitive, (4) conclude, based on the representation of the file that was found on the client device matching the representation of the sensitive file, that the file that was found on the client device includes sensitive information, and (5) perform a security action in response to concluding that the file that was found on the client device includes sensitive information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
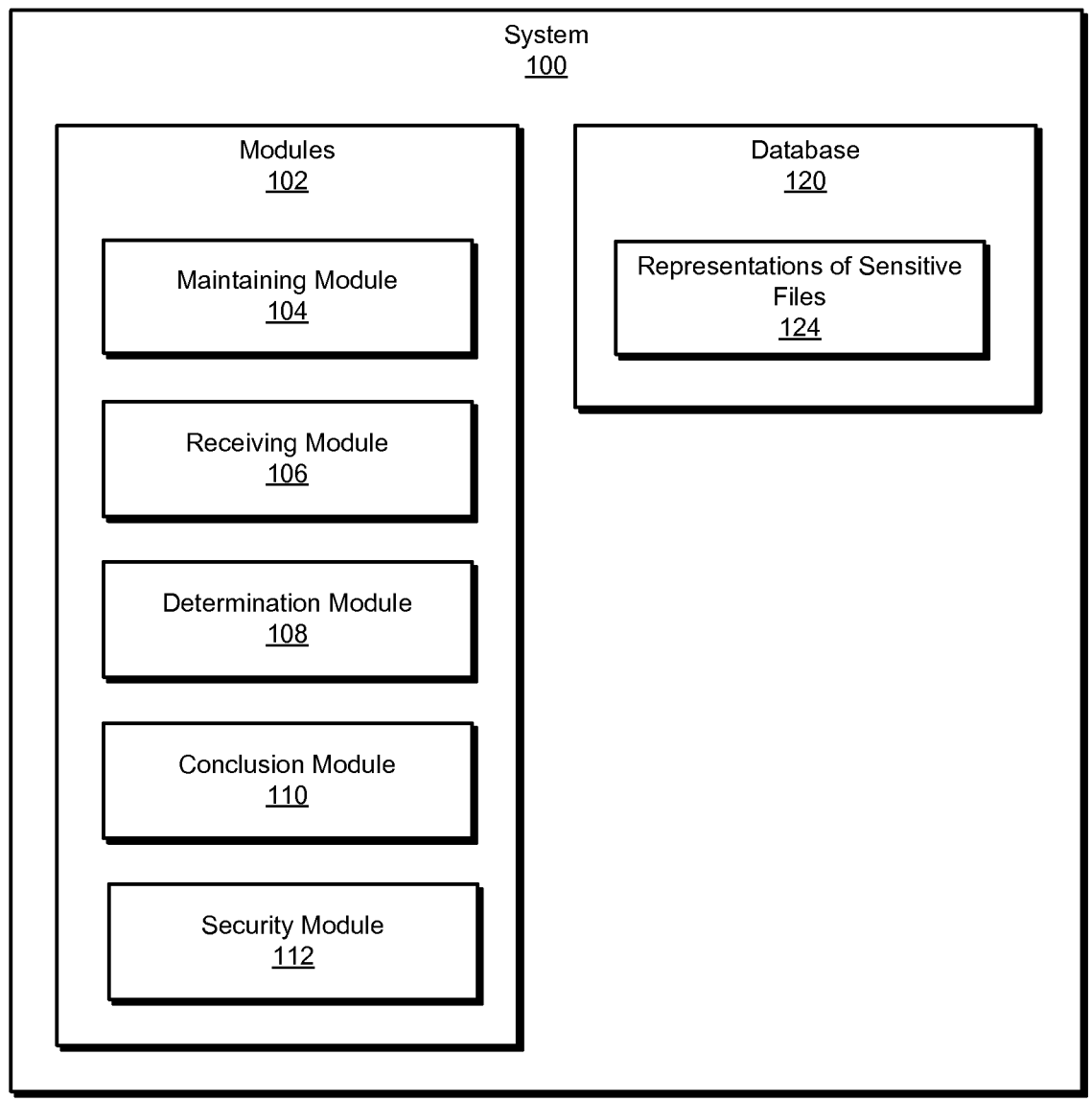
FIG. 1 is a block diagram of an exemplary system for determining that files found on client devices comprise sensitive information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining that files found on client devices comprise sensitive information. As will be explained in greater detail below, by sending representations of files (e.g., hashes of files) from clients to a server for DLP classification, files on client devices can be classified according to DLP policies without imposing a significant resource burden on the clients. Furthermore, by having a server determine the classifications of files on each client, the systems and methods herein may determine which clients include a large amount of sensitive information and should therefore be given special treatment with respect to DLP safeguards. Additionally, by storing hashes and DLP classifications of files from multiple devices on a server, the systems described herein may allow an analyst to quickly identify what types of files were accessed in a multi-device data breach.

Figure 2:
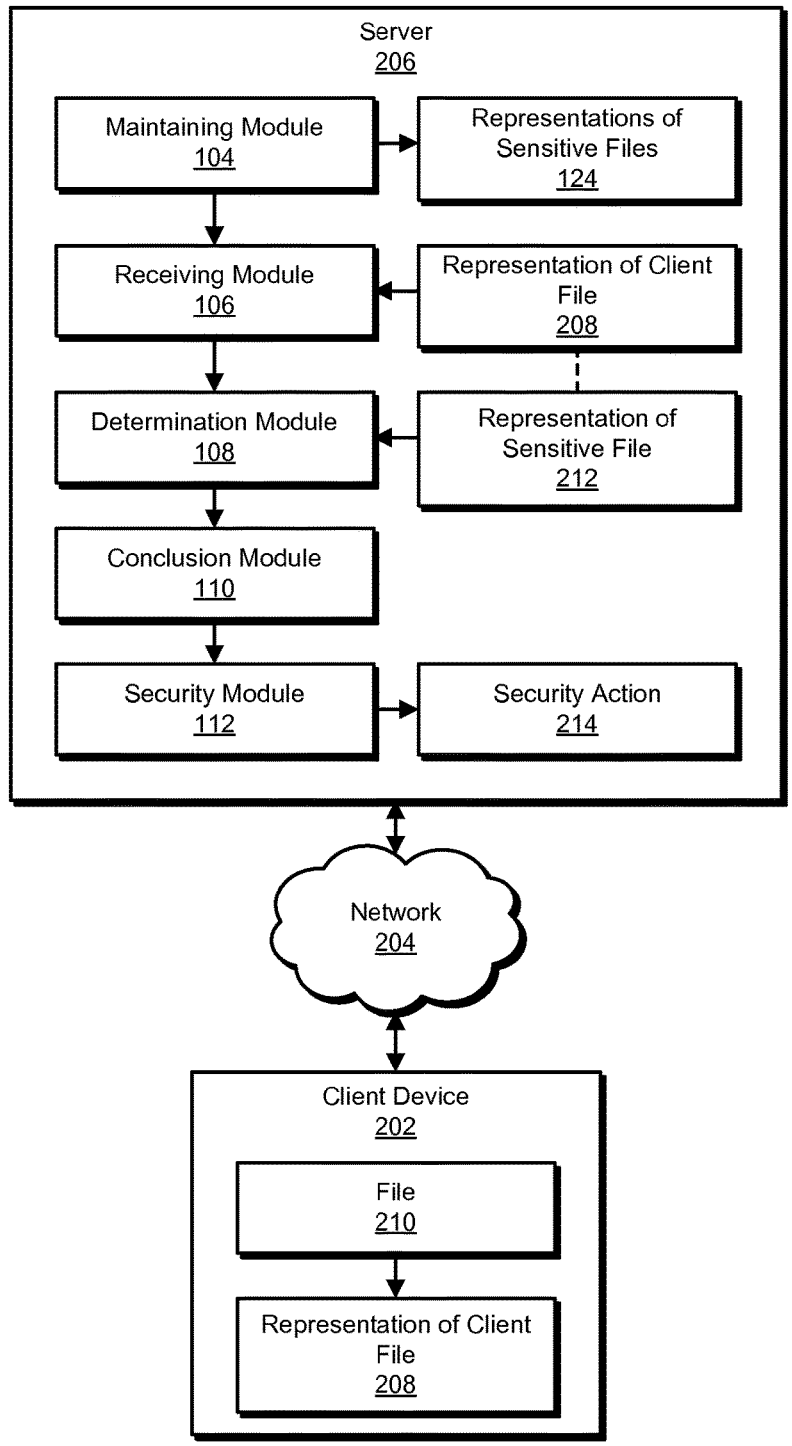
FIG. 2 is a block diagram of an additional exemplary system for determining that files found on client devices comprise sensitive information.
Figure 3:
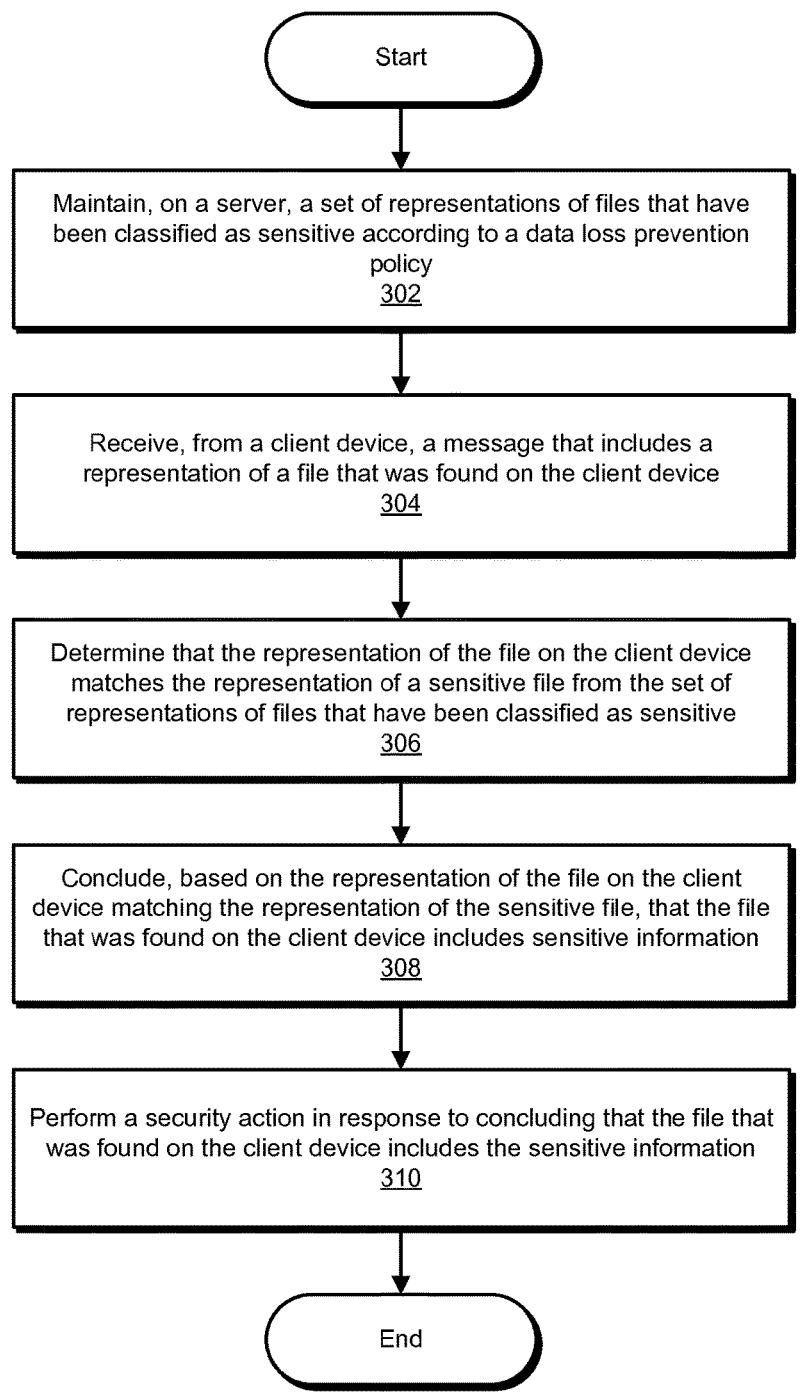
FIG. 3 is a flow diagram of an exemplary method for determining that files found on client devices comprise sensitive information.
Figure 4:
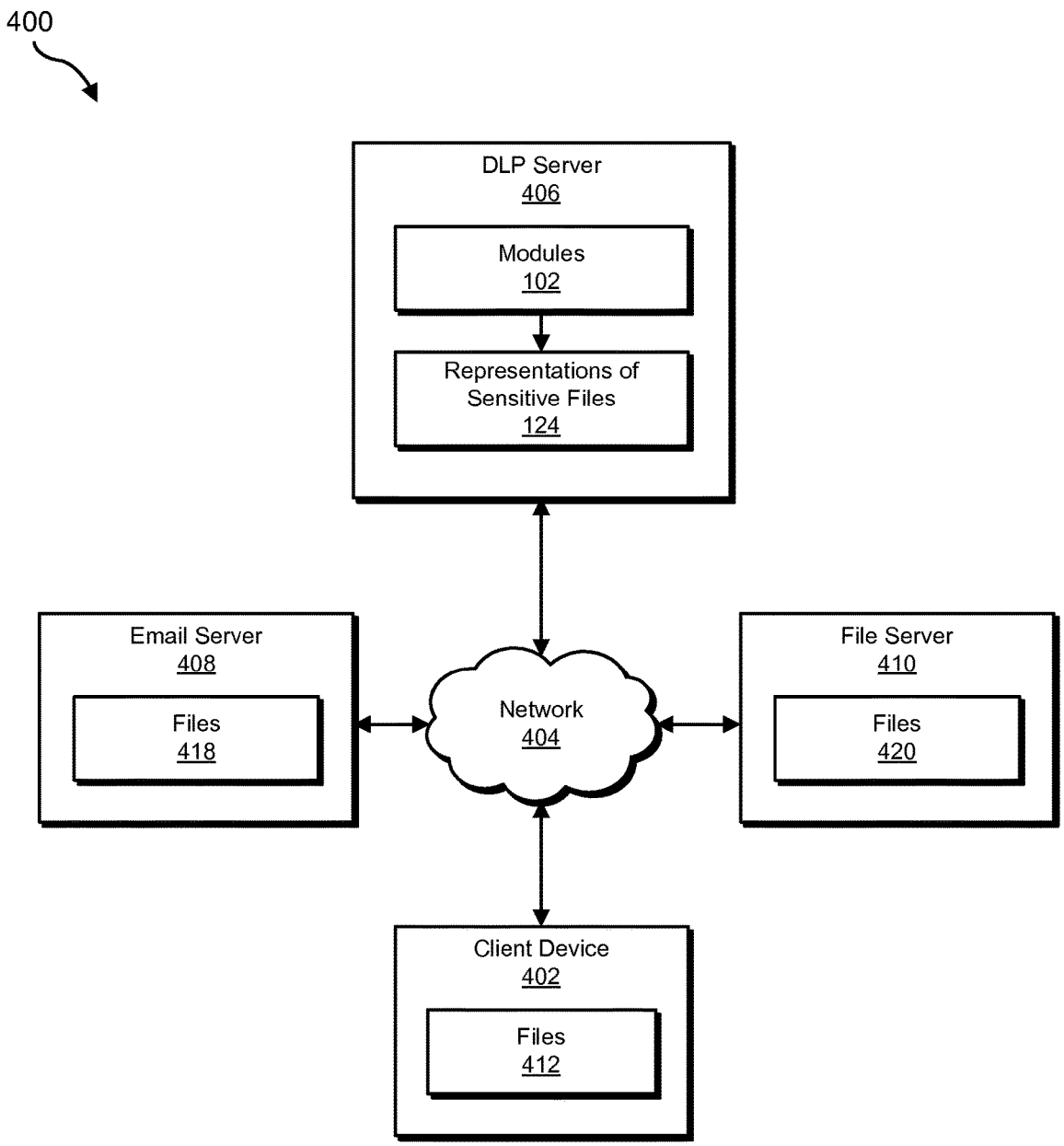
FIG. 4 is a block diagram of an exemplary computing system for determining that files found on client devices comprise sensitive information.

The following will provide, with reference to FIGS. 1, 2, and 4, detailed descriptions of exemplary systems for determining that files found on client devices comprise sensitive information. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for determining that files found on client devices include sensitive information. As illustrated in this figure, exemplary system 100 may include one or more modules 102 for performing one or more tasks. For example, and as will be explained in greater detail below, exemplary system 100 may include a maintaining module 104 that maintains, on a server, a set of representations of files that have been classified as sensitive according to a DLP policy. Exemplary system 100 may additionally include a receiving module 106 that receives, from a client device, a message that includes a representation of a file that was found on the client device. Exemplary system 100 may also include a determination module 108 that determines that the representation of the file that was found on the client device matches the representation of a sensitive file from the set of representations of files that have been classified as sensitive. Exemplary system 100 may additionally include a conclusion module 110 that concludes, based on the representation of the file that was found on the client device matching the representation of the sensitive file, that the file that was found on the client device includes sensitive information. Exemplary system 100 may also include a security module 112 that performs a security action in response to concluding that the file that was found on the client device includes sensitive information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store representations of files that have been classified according to a DLP policy, such as representations of sensitive files 124.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client device 202 in communication with a server 206 via a network 204. In one example, server 206 may be programmed with one or more of modules 102 and/or may store all or a portion of the data in database 120.

In one embodiment, one or more of modules 102 from FIG. 1 may, when executed by at least one processor of client device 202 and/or server 206, enable client device 202 and/or server 206 to determine that files found on client devices include sensitive information. For example, and as will be described in greater detail below, maintaining module 104 may maintain, on server 206, representations of sensitive files 124 according to a DLP policy. Client device 202 may send a message to server 206 that includes a representation 208 of a file 210 on client device 202 and/or a request for server 206 to classify file 210 according to the DLP policy. Receiving module 106 may receive the message from client device 202. Next, determination module 108 may determine that the representation 208 of file 210 on client device 202 matches representation of sensitive file 212 from representations of sensitive files 124. Conclusion module 110 may conclude, based on the representation 208 of file 210 on client device 202 matching representation of sensitive file 212, that file 210 on client device 202 may include sensitive information. Security module 112 may perform a security action 214 in response to concluding that file 210 may include sensitive information. For example, security module 112 may send a message to client 202 that includes a DLP classification of file 210.

Client device 202 generally represents any type or form of computing device capable of reading computer-executable instructions. Examples of client device 202 include, without limitation, laptops, tablets, desktops, servers, network devices, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of comparing representations of files. Examples of server 206 include, without limitation, DLP servers, security servers, application servers, and/or database servers configured to provide various services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between client device 202 and server 206.

FIG. 3 is a flow diagram of an exemplary computer-implemented method 300 for determining that files found on client devices comprise sensitive information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may maintain, on a server, a set of representations of files that have been classified as sensitive according to a DLP policy. For example, maintaining module 104 may, as part of server 206 in FIG. 2, maintain, on server 206, representations of sensitive files 124 according to a DLP policy.

The term "representations," as used herein, generally refers to any representation of a file and/or the contents of a file. In some embodiments, a representation may include a hash of a file and/or a name of a file. In some examples, a representation may include the outputs of one or more hash functions, fingerprints, checksums, feature vectors, and/or any other type of file identifiers that uniquely identify a file and/or file content. In embodiments that use hashes of files as representations of the files, hashes may be generated by any of a variety of cryptographic hash functions (including, e.g., MD5 and/or SHA-2). In some examples, a representation of a file may include a fuzzy hash that may match two similar but not identical files, such as the original draft of a document and a later draft of the same document with minor revisions. Additionally or alternatively, a representation may be generated from only a portion of the file contents and/or metadata.

The term "sensitive," as used herein, generally refers to any information that may cause financial, reputation, strategic, and/or legal damage to an individual and/or organization if the information is accessed by unauthorized persons. For example, sensitive information that may cause strategic damage to an organization of leaked may include financial projections, product plans, formulas, and/or product details. In other examples, sensitive information that may cause legal damage to an organization if leaked may include customer information, health records, and/or employee information. Further examples of sensitive information may include, without limitation, credit card data, contact information, account data, transaction data, payroll information, and/or internal communications.

The term "data loss prevention policy," or "DLP policy," as used herein, generally refers to any policy employed by an organization to prevent sensitive data from being accessed by unauthorized persons. DLP policies may include rules about the storage and/or transmission of sensitive information, software configured to enforce DLP rules on files that include sensitive information, physical enforcement of DLP rules by employees, and/or hardware modifications that may prevent the transmission of sensitive information. Examples of DLP policies may include, without limitation, "financial information may not be accessed on mobile devices," "company private data may not be copied to movable storage media," "personally identifying information may not be emailed," and/or "all confidential data must be encrypted." Examples of DLP enforcement may include, without limitation, preventing write requests to portable storage media, filtering outgoing emails to detect sensitive information, preventing access to sensitive data while devices are on unsecured networks, and/or encrypting sensitive information on computing devices.

Maintaining module 104 may maintain the set of representations of files in a variety of ways. In some embodiments, maintaining module 104 may be hosted on a security server and/or DLP server and may maintain the set of representations of files that have been classified as sensitive by receiving at least one set of representations of classified files from a file server and/or an email server. For example, a DLP application hosted on a file server may classify all of the files on the file server, create hashes of all of the files, and then send the hashes along with the classifications to maintaining module 104 on the DLP server. Examples of servers that may send sets of representations of classified files to maintaining module 104 may include, without limitation, document servers, cloud servers, file indexing servers, servers that relay documents to external cloud servers, email servers, messaging servers, and/or database servers.

Additionally or alternatively, maintaining module 104 may maintain the set of representations of files that have been classified as sensitive by identifying a set of unclassified files on the server and classifying the unclassified set of files according to the DLP policy. For example, maintaining module 104 may be hosted on a server that also stores files. In this example, maintaining module 104 may classify and/or create representations of the files stored on the server. In another embodiment, maintaining module 104 may receive files, rather than representations, from other servers, and may create representations of the received files in addition to classifying the files.

In some embodiments, maintaining module 104 may maintain a set of representations of files that are all classified as a single category of sensitive information. In other embodiments, maintaining module 104 may maintain a set of representations of files that are classified into multiple categories of sensitive information, such as "HIPAA protected data," "financial data," and/or "personally identifying information." In some examples, DLP categories may include "very sensitive," "moderately sensitive," and/or "somewhat sensitive." In another example, DLP categories may include "company confidential data," "HR confidential data," and/or "accounting confidential data." In some embodiments, maintaining module 104 may also maintain a set of representations of files that have been classified as not sensitive. In these embodiments, maintaining module 104 may maintain a representation of every file that has been analyzed by a DLP application.

At step 304, one or more of the systems described herein may receive, from a client device, a message that includes a representation of a file that was found on the client device. For example, receiving module 106 may, as part of server 206 in FIG. 2, receive, from client device 202, a message that includes representation 208 of a file that was found on client device 202.

The term "file that was found," as used herein, generally refers to any file that at one point in time resided on and/or passed through a particular computing device. In some examples, the file that was found on the client device may have been created on the client device. In other examples, the file that was found on the client device may have been copied to and/or uploaded to the client device. Additionally or alternatively, the file that was found on the client device may have been in the process of being transmitted through the client device (e.g., if the client device is a network gateway device).

The term "message," as used herein, generally refers to any type of electronic communication. For example, receiving module 106 may receive a transmission control protocol message from a client device. In another example, receiving module 106 may receive a hypertext transfer protocol message from a client device. Additionally or alternatively, receiving module 106 may receive a file transfer protocol message from a client device.

Receiving module 106 may receive the message in a variety of ways. For example, receiving module 106 may receive a message that includes a single file representation. In other examples, receiving module 106 may receive a message that includes a batch of representations of files. In some embodiments, receiving module 106 may receive multiple messages that include file representations from multiple client devices.

At step 306, one or more of the systems described herein may determine that the representation of the file that was found on the client device matches the representation of a sensitive file from the set of representations of files that have been classified as sensitive. For example, determination module 108 may, as part of server 206 in FIG. 2, determine that the representation 208 of file 210 on client device 202 matches representation of sensitive file 212 from representations of sensitive files 124.

Determination module 108 may determine that the representations of the files match in a variety of ways. For example, determination module 108 may compare two hashes and determine that they are identical. In another example, determination module 108 may compare two filenames and determine that they are similar. For example, determination module 108 may determine that the filename "151397 Specification (DRAFT 7.23.15) 4001-1060" is sufficiently similar to the filename "151397 Specification (DRAFT 7.28.15) 4001-1060" such that both filenames likely represent the same file and/or the same general category of file and should be treated the same under the DLP policy. Additionally or alternatively, determination module 108 may determine that the representations of the file meet or exceed a predetermined similarity threshold, such as 90% similar or 95% similar. In some embodiments, determination module 108 may iterate through some or all of the representations of classified files to determine whether the representation of the file found on the client device matches any of the representations of the classified files.

At step 308, one or more of the systems described herein may conclude, based on the representation of the file that was found on the client device matching the representation of the sensitive file, that the file that was found on the client device includes sensitive information. For example, conclusion module 110 may, as part of server 206 in FIG. 2, conclude, based on the representation 208 of file 210 on client device 202 matching representation of sensitive file 212, that the file that was found on client device 202 includes sensitive information.

Conclusion module 110 may conclude that the file on the client device includes sensitive information in a variety of ways. For example, conclusion module 110 may conclude that because the sensitive file was previously classified as "company confidential," the file on the client device should also be classified as "company confidential" and therefore includes confidential information. In another example, conclusion module 110 may conclude that because the sensitive file was previously classified as sensitive, the file on the client device must include sensitive information.

At step 310, one or more of the systems described herein may perform a security action in response to concluding that the file that was found on the client device may include the sensitive information. For example, security module 112 may, as part of server 206 in FIG. 2, perform security action 214 in response to concluding that the file that was found on client device 202 may include sensitive information.

Security module 112 may perform a variety of security actions. In some examples, security module 112 may perform the security action by sending a message to the client device that indicates that the file that was found on the client device includes the sensitive information. For example, security module 112 may send a message to the client that includes the classification of the file according to the DLP policy.

In some embodiments, security module 112 may perform a security action after determination module 108 compares the file representations from the client to file representations from multiple additional servers. As illustrated in FIG. 4, in one embodiment, a DLP server 406 may be connected to a client device 402, an email server 408, and/or a file server 410 via a network 404. In some embodiments, email server 408 and/or file server 410 may be hosted on different networks than DLP server 406. In this embodiment, DLP server 406 may host modules 102 and/or representations of sensitive files 124. In one embodiment, email server 408 may host files 418 and may classify files 418 according to a DLP policy and send representations of files 418, along with the corresponding classifications, to DLP server 406. In another embodiment, email server 408 may send files 418 to DLP server 406, and DLP server 406 may classify and/or create representations of files 418. Likewise, file server 410 may classify and/or create representations of files 420 and send the representations and/or classifications to DLP server 406. DLP server 406 may then add the representations of files 418 and/or 420 to representations of sensitive files 124.

Later, client device 402 may send representations of files 412 to DLP server 406. DLP server 406 may compare the representations of files 412 to representations of sensitive files 124, including the representations of files 418 and/or 420. DLP server 406 may then send a message back to client device 402 that includes the classifications of any files from files 412 that matched files in representations of sensitive files 124. For example, files 412 may include a file named "NextQuarterStrategy.pptx." In some examples, a file named "NextQuarterStrategy.pptx" may be part of files 418 hosted on document server 408 and may have been previously classified as "company confidential—strategy." In this example, security module 112 on DLP server 406 may send a message to client device 402 indicating that the file named "NextQuarterStrategy.pptx" is classified as "company confidential—strategy."

In some embodiments, the systems described herein may retroactively inform client devices of the classifications of files. In one embodiment, maintaining module 104 may add a representation of a new file to the set of files that have been classified as sensitive, determination module 108 may determine that the new file matches a representation of a previously received file from the client device, and conclusion module 110 may conclude, based on the representation of the previously received file from the client device matching the representation of the new file, that the previously received file includes additional sensitive information. In some embodiments, security module 112 may perform an additional security action in response to concluding that the previously received file from the client device includes the additional sensitive information. For example, files 412 may include a file "New Idea IDF.pdf," the representation of which does not match any of the representations of sensitive files 124. Later, the file "New Idea IDF.pdf" may be uploaded to file server 410 and become a part of files 420. File server 410 may classify new files periodically and/or as they are uploaded, and may send representations and/or classifications of the new files to DLP server 406. In this example, "New Idea.pdf" may be classified as "company confidential—inventions." DLP server 406 may determine that the representation of the file "New Idea.doc" from client device 402 now matches a new file within representations of sensitive files 124, and may send a message to client device 402 indicating that the file "New Idea.pdf" is classified as "company confidential—inventions."

In some embodiments, the client device may be an endpoint user device, such as a laptop, desktop, tablet, or mobile device. In another embodiment, the client device may include a network gateway and security module 112 may perform the security action by blocking the file from being transmitted by the network gateway. In this embodiment, the network gateway may send a DLP server representations of any files that are being transmitted through the gateway. If the DLP server responds that, according to the DLP policy, the files should not be transmitted to their intended destination, the network gateway may then block the transmission of the file. In some embodiments, the network gateway and/or the DLP server may inform and administrator that a user was attempting to transmit sensitive files and/or warn the user not to transmit sensitive files.

In one embodiment, security module 112 may determine, based at least in part on concluding that the file found on the client device includes the sensitive information, that the client device is a high-importance device that includes sensitive information. As used herein, the terms "high-importance device" and "high-value device" generally refer to any device that contains sensitive information. In some examples, a device may be classified as high-value if it contain more than a predetermined amount of sensitive information, if it contains any sensitive information and is also a device of an executive or administrator, and/or if it contains a particular type of sensitive information (e.g., trade secrets).

Security module 112 may increase DLP protections for a client device in response to determining that the client device is a high-value device. For example, security module 112 may quarantine the client device. In another example, security module 112 may block and/or filter outgoing transmissions from the client device. In some embodiments, security module 112 may rank client devices by value and/or display a ranked list of client devices to an administrator. Additionally or alternatively, security module 112 may increase security settings on the high-value client device, such as increasing the frequency of anti-virus scans and/or customizing firewall settings.

In some examples, security module 112 may use the classifications from conclusion module 110 to determine which of the files involved in a data breach included sensitive information. For example, if ten files on the client device were accessed by an unauthorized attacker, security module 112 may determine that nine of the files included sensitive information about chemical formulas and one of the files included no sensitive information. In another example, security module 112 may determine that of the fifty files on the client device that were accessed by the attacker, forty of the files were classified as including sensitive credit card data. In this example, security module 112 may present the information about the files to an analyst who may determine that the attacker was after credit card data and that customers whose data was accessed must be informed as per regulatory requirements.

Figure 5:
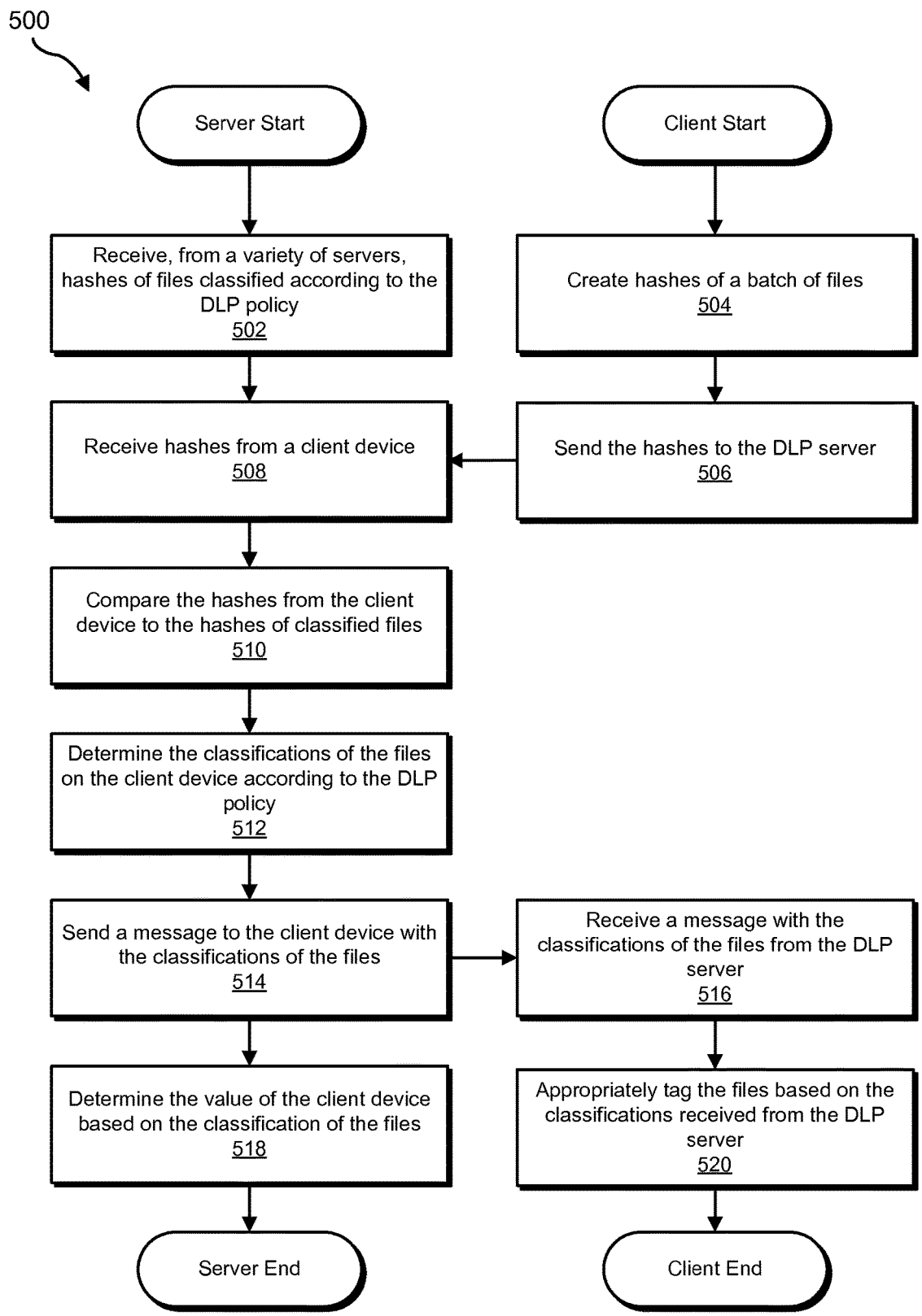
FIG. 5 is a flow diagram of an exemplary method for determining that files found on client devices comprise sensitive information.

The foregoing discussion of the method in FIG. 3 focused on steps that may be performed from the perspective of a server. FIG. 5 shows how clients and data servers may interact with a DLP server to identify and handle sensitive information found on the client. In particular, as show in step 502 of FIG. 5, a DLP server may receive, from a variety of servers, representation of files (e.g., hashes) classified according to a DLP policy. For example, the DLP server may receive hashes from file servers, document servers, and/or email servers. Meanwhile, at step 504, a client may create hashes of a batch of files. In some embodiments, the client device may create batches of file hashes in the background. In other embodiments, the client device may create hashes of files as the files are created, accessed, and/or modified and may send the hashes of the files in a batch and/or as they are created. In some examples, the client may use a product such as SYMANTEC ENDPOINT SECURITY to create the hashes. At step 506, the client may send the hashes to the DLP server. At step 508, the DLP server may receive the hashes from the client device.

At step 510, the DLP server may compare the hashes from the client device to the hashes of classified files. At step 512, the DLP server may determine the classifications of the files from the client device according to the DLP policy based on the classifications of the files with hashes on the DLP server that matched the hashes from the client device. At step 514, the DLP server may send a message to the client device with the classifications of the files. In some embodiments, at step 518, the DLP server may determine the value of the client device based on the classification of the files. For example, if the client device hosts many highly sensitive files, the client device may be a high value device. Meanwhile, at step 516, the client device may receive the message from the server, and at step 520, the client device may appropriately tag the files based on the classifications received from the DLP server.

As described in connection with method 300 above, client devices may compute hashes of files on devices. The client devices may then send the hashes to a DLP server that stores a set of hashes of documents that have already been classified according to the organization's DLP policy. The DLP software may find the intersection of hashes of sensitive files found on servers with hashes of files sent by the client, and may inform the client device of these matches in addition to taking other potential security actions, such as blocking the files from being transmitted and/or informing an administrator about the sensitive files. In some examples, a DLP server may notify a client device that a file hash which was previously sent by the client device matches a file hash that was recently received from a server and that is categorized as including sensitive information. Additionally, the DLP server may take further actions to protect clients that contain many sensitive files, such as increasing security settings and/or quarantining high-value client devices. By classifying files on servers and only requiring client devices to compute hashes of the documents, the systems and methods described herein may classify documents on client devices according to DLP policies without imposing a resource burden on the client devices. In addition, by monitoring which client devices contain a large number of sensitive files, the systems and methods presented herein may provide increased DLP protection for high-value devices.

Figure 6:
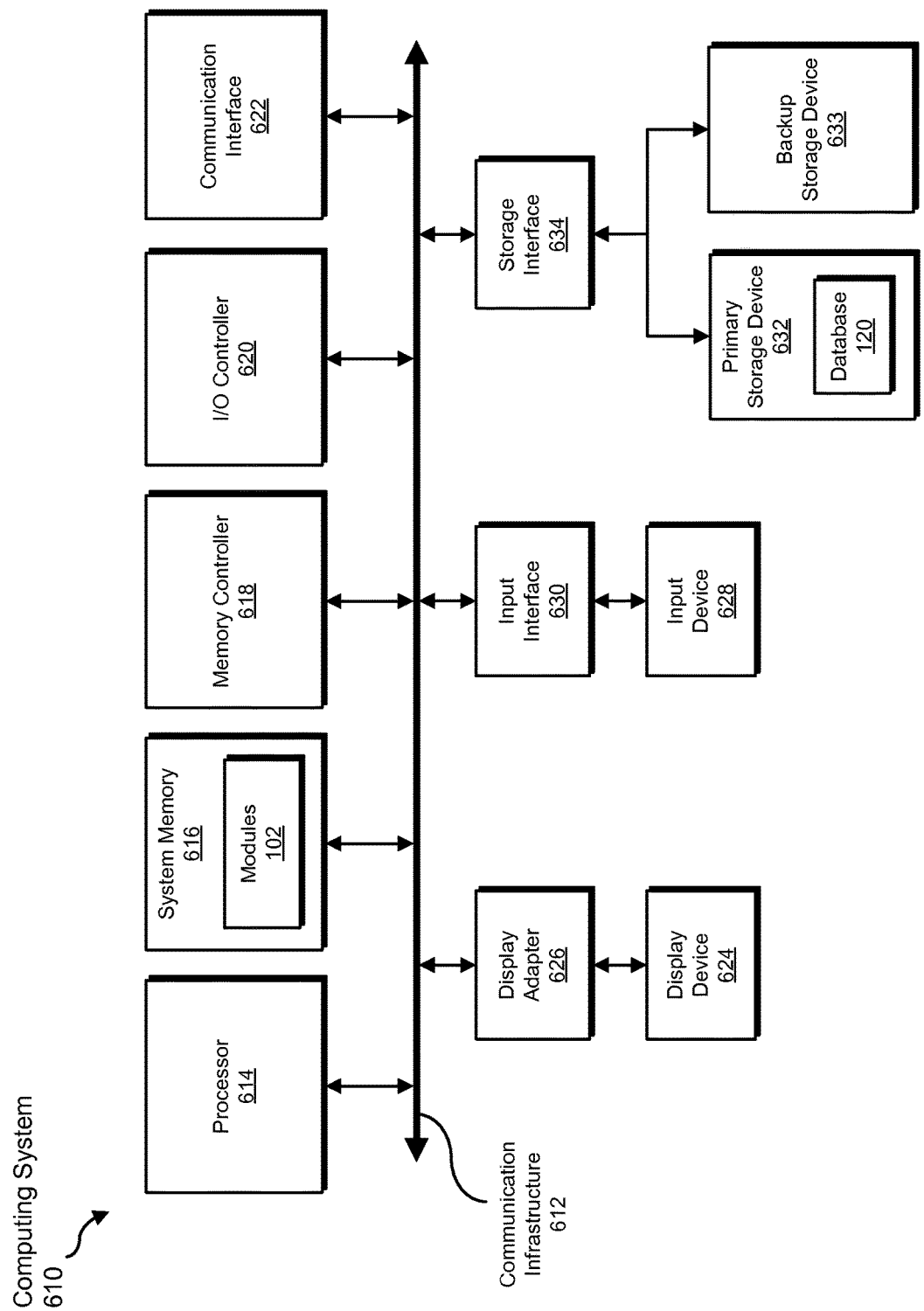
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
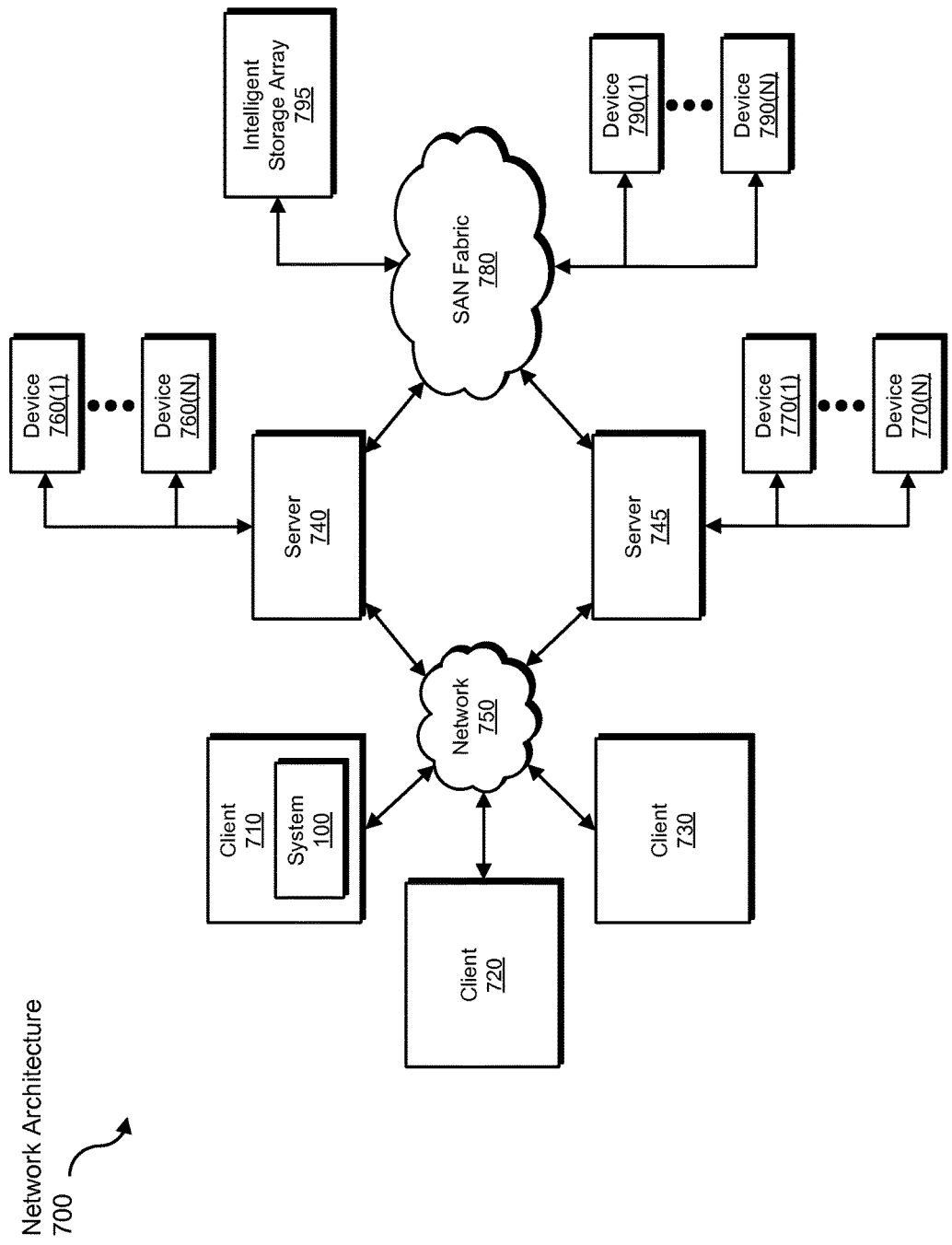
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750.

As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for determining that files found on client devices comprise sensitive information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive files to be transformed, transform the files into file representations, output a result of the transformation to a DLP server, use the result of the transformation to compare file representations to one another, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining that files found on client devices comprise sensitive information, at least a portion of the method being performed by a computing device comprising at least one processor, the method comprising:
   maintaining, on a server, a set of hashes of files that have been classified as sensitive according to a data loss prevention policy;
   receiving, from a client device, a message that includes a hash of a file that was found on the client device;

determining that the hash of the file that was found on the client device matches the hash of a sensitive file from the set of hashes of files that have been classified as sensitive;

concluding, based on the hash of the file that was found on the client device matching the hash of the sensitive file, that the file that was found on the client device comprises sensitive information;

performing a security action in response to concluding that the file that was found on the client device comprises the sensitive information;

determining, based at least in part on concluding that the file found on the client device comprises the sensitive information, that the client device is a high-importance device that comprises sensitive information;

increasing data loss prevention protections for the client device in response to determining that the client device is a high-value device.

2. The computer-implemented method of claim 1, wherein performing the security action comprises sending a message to the client device that indicates that the file that was found on the client device comprises the sensitive information.

3. The computer-implemented method of claim 1, wherein maintaining the set of hashes of files that have been classified as sensitive comprises receiving at least one set of hashes of classified files from at least one of a file server or an email server.

4. The computer-implemented method of claim 1, wherein maintaining the set of hashes of files that have been classified as sensitive comprises:
   identifying a set of unclassified files on the server;
   classifying the unclassified set of files according to the data loss prevention policy.

5. The computer-implemented method of claim 1, wherein the client device comprises a network gateway.

6. The computer-implemented method of claim 5, wherein performing the security action comprises blocking the file from being transmitted by the network gateway.

7. The computer-implemented method of claim 1, further comprising:
   adding a hash of a new file to the set of files that have been classified as sensitive;
   determining that the new file matches a hash of a previously received file from the client device;
   concluding, based on the hash of the previously received file from the client device matching the hash of the new file, that the previously received file comprises additional sensitive information;
   performing an additional security action in response to concluding that the previously received file from the client device comprises the additional sensitive information.

8. The computer-implemented method of claim 1, further comprising:
   creating, on the client device, hashes of a plurality of files;
   sending, from the client device to the server, the hashes of the files;
   comparing, on the server, the hashes of the files to the set of hashes of files that have been classified;
   sending, from the server to the client device, an indication of which of the hashes of the files matched hashes of files that have been classified as sensitive.

9. A system for determining that files found on client devices comprise sensitive information, the system comprising:

a maintaining module, stored in memory, that maintains, on a server, a set of hashes of files that have been classified as sensitive according to a data loss prevention policy;

a receiving module, stored in memory, that receives, from a client device, a message that includes a hash of a file that was found on the client device;

a determination module, stored in memory, that determines that the hash of the file that was found on the client device matches the hash of a sensitive file from the set of hashes of files that have been classified as sensitive;

a conclusion module, stored in memory, that concludes, based on the hash of the file that was found on the client device matching the hash of the sensitive file, that the file that was found on the client device by sensitive information;

a security module, stored in memory, that:
   performs a security action in response to concluding that the file that was found on the client device by the sensitive information;
   determines, based at least in part on concluding that the file found on the client device comprises the sensitive information, that the client device is a high-importance device that comprises sensitive information;
   increases data loss prevention protections for the client device in response to determining that the client device is a high-value device;

at least one physical processor configured to execute the maintaining module, the receiving module, the determination module, the conclusion module, and the security module.

10. The system of claim 9, wherein the security module performs the security action by sending a message to the client device that indicates that the file that was found on the client device by the sensitive information.

11. The system of claim 9, wherein the maintaining module maintains the set of hashes of files that have been classified as sensitive by receiving at least one set of hashes of classified files from at least one of a file server or an email server.

12. The system of claim 9, wherein the maintaining module maintains the set of hashes of files that have been classified as sensitive by:
   identifying a set of unclassified files on the server;
   classifying the unclassified set of files according to the data loss prevention policy.

13. The system of claim 9, wherein the security module:
   determines, based at least in part on concluding that the file found on the client device comprises the sensitive information, that the client device is a high-importance device that comprises sensitive information;
   increases data loss prevention protections for the client device in response to determining that the client device is a high-value device.

14. The system of claim 9, wherein the client device comprises a network gateway.

15. The system of claim 14, wherein the security module performs the security action by blocking the file from being transmitted by the network gateway.

16. The system of claim 9, wherein:
   the maintaining module adds a hash of a new file to the set of files that have been classified as sensitive;
   the determination module determines that the new file matches a hash of a previously received file from the client device;

the conclusion module concludes, based on the hash of the previously received file from the client device matching the hash of the new file, that the previously received file comprises additional sensitive information;

the security module performs an additional security action in response to concluding that the previously received file from the client device comprises the additional sensitive information.

17. The system of claim 9:

further comprising a creation module, stored in memory, that creates, on the client device, hashes of a plurality of files;

further comprising a sending module, stored in memory, that sends, from the client device to the server, the hashes of the files;

wherein the determination module compares, on the server, the hashes of the files to the set of hashes of files that have been classified;

wherein the security module sends, from the server to the client device, an indication of which of the hashes of the files matched hashes of files that have been classified as sensitive.

18. A non-transitory computer-readable medium comprising one or more computer-readable instructions that, when executed by at least one processor of a computing device, cause the computing device to:

maintain, on a server, a set of hashes of files that have been classified as sensitive according to a data loss prevention policy;

receive, from a client device, a message that includes a hash of a file that was found on the client device;

determine that the hash of the file that was found on the client device matches the hash of a sensitive file from the set of hashes of files that have been classified as sensitive;

conclude, based on the hash of the file that was found on the client device matching the hash of the sensitive file, that the file that was found on the client device comprises sensitive information;

perform a security action in response to concluding that the file that was found on the client device comprises the sensitive information;

determine, based at least in part on concluding that the file found on the client device comprises the sensitive information, that the client device is a high-importance device that comprises sensitive information;

increase data loss prevention protections for the client device in response to determining that the client device is a high-value device.

19. The non-transitory computer-readable medium of claim 18, wherein the one or more computer-readable instructions cause the computing device to perform the security action by sending a message to the client device that indicates that the file that was found on the client device comprises the sensitive information.

* * * * *